United States Patent
Satou et al.

(10) Patent No.: US 7,735,909 B2
(45) Date of Patent: Jun. 15, 2010

(54) BODY REINFORCEMENT DEVICE FOR A VEHICLE

(75) Inventors: Masahiro Satou, Shizuoka-ken (JP); Katsuhiro Kondou, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 442 days.

(21) Appl. No.: 10/597,941

(22) PCT Filed: Feb. 7, 2005

(86) PCT No.: PCT/JP2005/001768
§ 371 (c)(1),
(2), (4) Date: Jun. 21, 2007

(87) PCT Pub. No.: WO2005/077738
PCT Pub. Date: Aug. 25, 2005

(65) Prior Publication Data
US 2007/0290525 A1 Dec. 20, 2007

(30) Foreign Application Priority Data
Feb. 13, 2004 (JP) ............................. 2004-036266

(51) Int. Cl.
*B62D 25/20* (2006.01)
(52) U.S. Cl. .................... 296/204; 296/30; 296/203.02; 280/781

(58) Field of Classification Search ............ 296/193.07, 296/30, 204, 193.08, 193.09, 203.04, 203.02; 180/89.1; 280/781
See application file for complete search history.

(56) References Cited

U.S. PATENT DOCUMENTS 6,206,460 B1 * 3/2001 Seeliger et al. ............. 296/204

FOREIGN PATENT DOCUMENTS

| | | |
|---|---|---|
| DE | 102 47 492 A1 | 4/2004 |
| EP | 0 955 228 A2 | 11/1999 |
| JP | 04-238781 | 8/1992 |
| JP | 06-099846 | 12/1994 |
| JP | 2002-211437 | 7/2002 |
| WO | WO 2005/066011 A1 | 7/2005 |

OTHER PUBLICATIONS

Supplementary European Search Report dated Feb. 14, 2008.

* cited by examiner

*Primary Examiner*—Joseph D Pape
(74) *Attorney, Agent, or Firm*—Keating & Bennett, LLP (57) ABSTRACT

A body reinforcement device comprises a rigid reinforcement member that connects two vehicle body portions to be reinforced. The body reinforcement device also comprises a damping force member that spans the space between the two vehicle body portions. The rigid reinforcement member and the damping force member preferably extend generally parallel to each other.

4 Claims, 7 Drawing Sheets

BODY REINFORCEMENT DEVICE FOR A VEHICLE

CROSS-REFERENCE TO RELATED APPLICATIONS

This application is a National Phase application of International Application No. PCT/JP2005/001768, filed Feb. 7, 2005, which claimed priority to Japanese Application No. 2004-036266, filed Feb. 13, 2004, each of which is hereby incorporated by reference in its entirety.

BACKGROUND OF THE INVENTION

1. Field of the Invention

The present invention relates to a vehicle body reinforcement device for reinforcing a body when the device is mounted to the body such that two portions to be reinforced are connected to each other.

2. Description of the Related Art

Conventionally, a body of a motorcar has been formed such that a highest possible strength is effected while aiming at weight saving. In such bodies, a reinforcement member is mounted to a region where a greater strength is required compared with other regions, such as a section where a wheel suspension device is mounted. The reinforcement member is mounted in such a manner that two portions to be reinforced are connected to each other. As for such a reinforcement member, there has been known one formed in the shape of a rod by a rigid body or one in which damping force generating means is provided, for example, as shown in JP-A-2002-211437.

The reinforcement member disclosed in JP-A-2002-211437 is formed in an elongated shape and damping force generating means is provided in its middle in the longitudinal direction. The damping force generating means can be a hydraulic damper or a rubber member. This reinforcement member spans the space between two portions to be reinforced of a body. In one use, the reinforcement member can be mounted between a suspension mounting portion on the left side of the body and a suspension mounting portion on the right side thereof.

The body of an automobile is some times subjected to elastic deformation in a direction in which the distance between the two portions to be reinforced is shortened or lengthened, such as during quick handling operations. At this time, a load is also applied, in the direction of compression or the direction of elongation, to the reinforcement member connecting the portions to be reinforced to each other. If a reinforcement member formed only by a rigid body is used, the reinforcement member is subjected to elastic deformation in the direction of compression or the direction of elongation by the load applied to the body when it is deformed, as described above.

This reinforcement member stretches or contracts by its own elasticity when it is released from the load or when the force causing the elastic deformation vanishes. The conventional rigid reinforcement member begins to vibrate in the longitudinal direction due to loading during quick handling operations because of the member's longitudinal elongation and contraction. Therefore, while the vehicle body using this rigid reinforcement member is less likely to be elastically deformed, it may provide unnecessary vibration in the reinforcement member.

Such a disadvantage can be reduced by using a reinforcement member having damping force generating means such as disclosed in JP-A-2002-211437. This is because vibration of the reinforcement member itself is damped by the damping force generating means.

However, such damping reinforcement member has a decreased repulsion force under axial loading. Therefore, the ability to suppress deformation of the body is lower than that of a rigid reinforcement member.

In view of the foregoing, a body reinforcement device for a vehicle is desired that can reliably suppress deformation of a body and which reduces vibration in the reinforcement device as well.

SUMMARY OF THE INVENTION

Accordingly, one configuration of a body reinforcement device for a vehicle that is arranged and configured in accordance with certain features, aspects and advantages of the present invention is provided with a reinforcement member for rigidly connecting two portions to be reinforced of a vehicle body with each other, and the device is provided with a damping force generating means for generating viscous damping force spanning the space between the portions to be reinforced.

Preferably, a reinforcement member substantially functions as a beam and reinforces the vehicle body when a load is applied to the reinforcement member in the direction of compression or the direction of elongation. When the reinforcement member is elastically deformed in the direction of compression or the direction of elongation by the load applied to the reinforcement member, the reinforcement member stretches or contracts by its own elasticity and begins to vibrate when released from the load. However, when combined with the damping force generating means that also spans the space between the two portions to be reinforced, the displacement of the reinforcement member in the longitudinal direction is kept small by the damping force generating means, whereby the vibration is damped.

Therefore, a body reinforcement device can be provided in which the deformation of a body can be suppressed reliably and limited vibration, if any, is produced.

According to other features, aspects and advantages of certain embodiments of the invention, the ends of the reinforcement member and the damping force generating means are attached to a mounting bracket and are rigidly connected to each other through the mounting bracket. Therefore, vibration of the reinforcement member can be transmitted directly from one end thereof to one end of the damping force generating means through the mounting bracket, and vibration can be dampened more reliably by the damping force generating means. In addition, because the mounting bracket is mounted to the portion to be reinforced, the ends of the reinforcement member and the damping force generating means can be mounted at the same time to the portion to be reinforced. Therefore, this body reinforcement device can be mounted to the body more easily compared with when the reinforcement member and the damping force generating means are mounted separately to the body.

According to other features, aspects and advantages of certain embodiments of the invention, it is possible that one of the reinforcement member and the damping force generating means is located on the same axial line as an imaginary line connecting the two portions to be reinforced of the body while a plurality of members (e.g., the other of the reinforcement and damping components) are provided at positions generally symmetrical with respect to the imaginary line. In such a device, no moment due to a reaction force is produced when a load is applied from the portion to be reinforced of the body and the body can be reinforced more firmly when the reaction force is exerted in the longitudinal direction (along the imaginary line).

BRIEF DESCRIPTION OF THE DRAWINGS

These and other features, aspects and advantages of the present invention will now be described with reference to the drawings of several preferred embodiments, which embodiments are intended to illustrate and not to limit the invention.

DETAILED DESCRIPTION OF THE PREFERRED EMBODIMENT

The body reinforcement devices discussed herein can be used as a device for reinforcing bodies of the vehicles such as cars, trucks or buses. Now, one embodiment of the body reinforcement device for a vehicle according to certain features, aspects and advantages of the present invention will be described in detail with reference to FIG. 1 and FIG. 2.

In these figures, a reference numeral 1 denotes a reinforcement device assembly formed by using two body reinforcement devices arranged and configured in accordance with an embodiment having certain features, aspects and advantage of the present invention. The illustrated reinforcement device assembly 1, as shown in FIG. 2, is a device for reinforcing the portion in a chassis 3 of an automobile where a front wheel suspension device 4 is mounted.

The front wheel suspension device 4, as is conventionally well-known, comprises a front suspension member 5 forming part of the chassis 3; a pair of left and right lower arms 6, 6 extending in a lateral direction of the vehicle body from both ends of the front suspension member 5 in the lateral direction; a pair of left and right upper arms (not shown) connected to the ends of these lower arms 6, 6 through a knuckle (not shown); a cushion unit or shock absorber (not shown) provided between the swinging portion of one of both these arms and a body 3a of the chassis 3; and the like.

The front suspension member 5 preferably supports part of an engine (not shown) and a forward pivot portion 7 of the lower arm 6. The front suspension member 5 can be rubber-mounted or rigid-mounted to the body 3a of the chassis 3.

Figure 2:
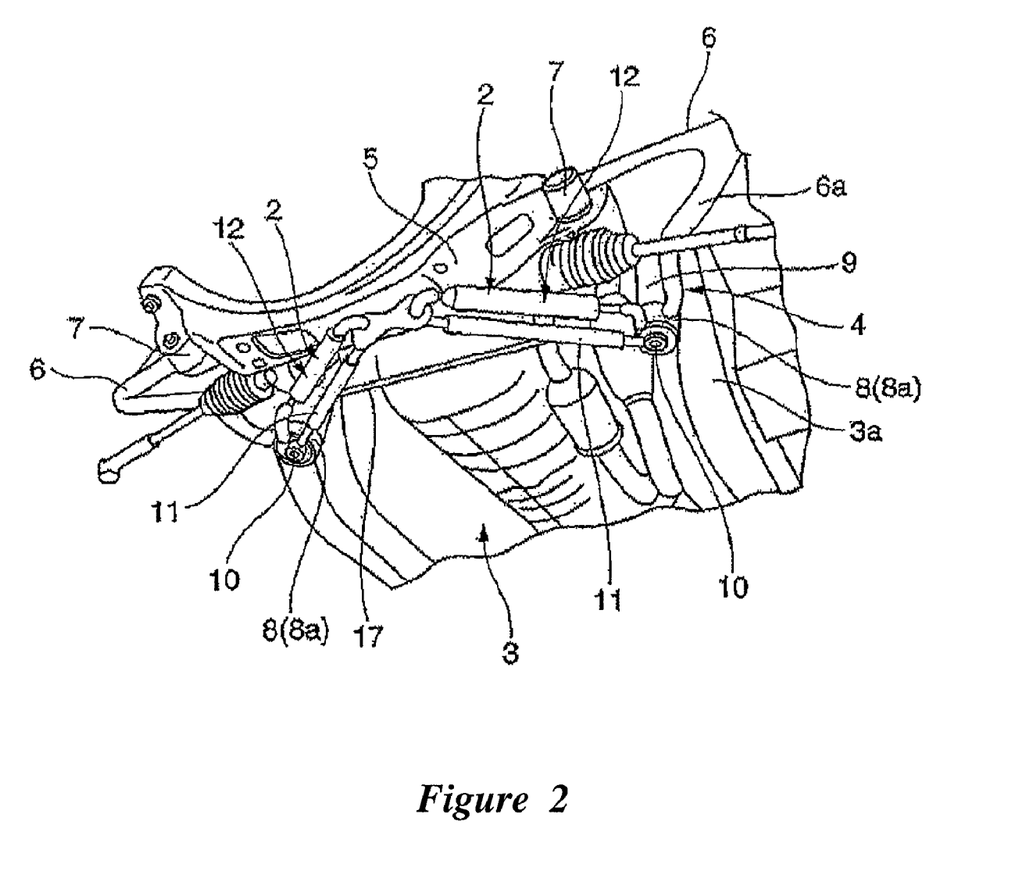
FIG. 2 is a perspective view showing the reinforcement device mounted to a vehicle body.

The lower arm 6, as shown in FIG. 2, can be supported by the forward pivot portion 7 and a rear pivot portion 8 (described later) for up and down swinging movement relative to the chassis 3. The rear pivot portion 8 can be provided with an inner cylinder (not shown), an outer cylinder 8a housing the inner cylinder and comprising an arm body 6a of the lower arm 6 welded thereto. A cushion rubber (not shown) can be provided between the inner and outer cylinders. The rear pivot portion 8 can be mounted to a mounting seat 9 of the body 3a of the chassis 3 with a mounting bolt 10. In one configuration, the rear pivot portion 8 can project from the mounting seat 9 of the body 3a.

Mounting to the mounting seat 9 of the rear pivot portion 8 is performed by placing the rear pivot portion 8 on the mounting seat 9 with its axis pointing generally vertically and fastening the inner cylinder to the mounting seat 9 with the mounting bolt 10 inserted through the inner cylinder. That is, with the rear pivot portion 8 mounted on the mounting seat 9, the cushion rubber is elastically deformed and the outer cylinder 8a is displaced with respect to the inner cylinder, so that the arm body 6a is capable of making swinging movements.

The reinforcement device assembly 1 preferably is formed by two body reinforcement devices 2, 2 that are combined in the shape of a letter V in plan view so that the chassis 3 can be reinforced by the connection of the laterally central portion of the front suspension member 6 and the left and right mounting seats 9.

Figure 1:
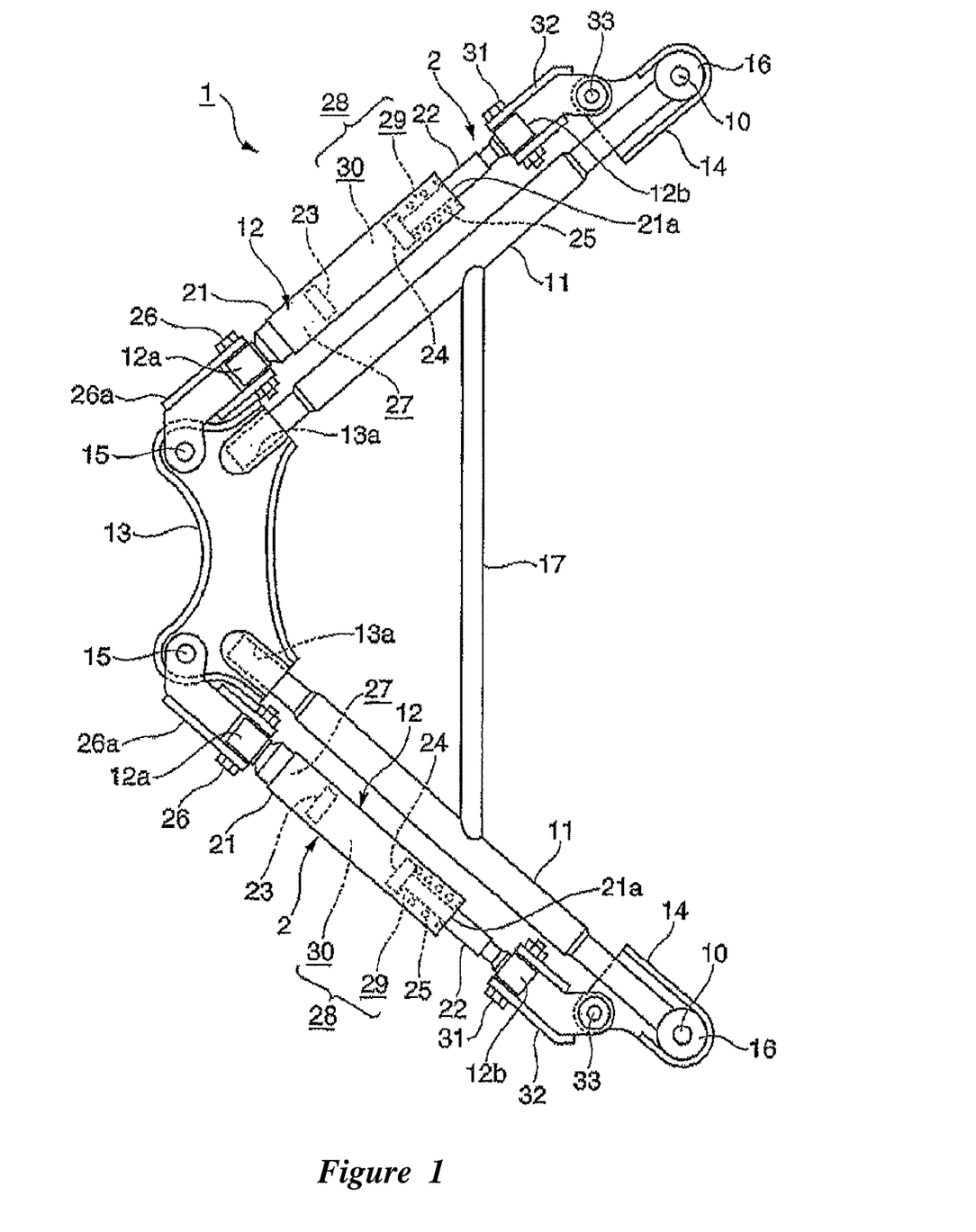
FIG. 1 is a plan view showing a body reinforcement device for a vehicle, which device is arranged and configured in accordance with certain features, aspects and advantages of the present invention.

The body reinforcement device 2, as shown in FIG. 1, can comprise a rod 11 and a hydraulic damper 12. The rod 11 can be formed by one metallic round bar while the hydraulic damper 12 can be disposed alongside the rod 11 to be generally parallel to the rod 11. A first mounting bracket 13 can connect one end of each of these members 11, 12 to each other (see, e.g., left side ends in FIG. 1) and a second mounting bracket 14 can connect the end of each of these members 11, 12 to each other. In the illustrated embodiment, the rod 11 comprises the reinforcement member and the hydraulic damper 12 comprises the damping force generating means. Other configurations of each of the reinforcement member and the damping force generating means also can be used.

The first mounting bracket 13 according to this embodiment can be formed larger than the second mounting bracket 14. The first mounting bracket 13 is attached to one end of the two reinforcement devices. The first mounting bracket 13 can be fixed with two bolts 15, 15, or other suitable fasteners, to the portion of the body to be reinforced. In the illustrated configuration, "the portion of the vehicle body to be reinforced to which this first mounting bracket 13 is mounted" refers to the laterally central portion of the front suspension member 6.

The rod 11 of the reinforcement devices 2 can be made from a hollow round bar that has a thicker central portion relative to each end. The end of the rod 11 opposite the first mounting bracket 13 can be welded to a coupling boss 16 and a second mounting bracket 14.

In one configuration, connection of one end of the rod 11 to the mounting bracket 13 can be performed by inserting one end of the rod 11 into a mounting hole 13a formed in the first mounting bracket 13 and then welding the end of the rod 11 to the opening of the mounting hole 13a. The mounting hole 13a can be inclined such that its axis is located gradually outwardly of the body toward the rear of the body (i.e., rightward in FIG. 1) in order that the two rods 11 are attached to the first mounting bracket 13 in the shape of a letter V in plan view.

The other end of the rod 11 can be secured to the portion of the body to be reinforced together with the second mounting bracket 14 by the mounting bolt 10. In the illustrated embodiment, "the portion to be reinforced" refers to the mounting seat 9 to which the rear pivot portion 8 of the lower arm 2 is mounted, as shown in FIG. 2. That is, the mounting bolt 10 fastens the rear pivot portion and second mounting bracket 14 together.

The rod 11 according to this embodiment, as shown in FIG. 2, preferably is connected to the rod 11 of the other reinforcement device 2 through a cross member 17.

The hydraulic damper 12 can comprise a cylinder 21, a piston rod 22 moveably mounted to the cylinder 21, a free piston 23 fitted for movement in the cylinder 21 opposite to the piston rod 22, a piston 24 with a throttle secured to the piston rod 22 at its end, a compression coil spring 25 for biasing the piston toward the free piston 23, and the like.

The cylinder 21 can be provided, at its end on the opposite side from the piston rod 22, with a boss 12a, and can be secured to a mounting plate 26a by the boss 12a and a fixing bolt 26. The mounting plate 26a can be secured to the first mounting bracket 13 with a bolt 15 used to secure the first mounting bracket 13 to the front suspension member 5. The mounting plate 26a may be welded to the first mounting bracket 13.

The interior of the cylinder 21 can be divided by the free piston 23 into a high pressure gas chamber 27 and an oil chamber 28. The oil chamber 28 can be divided by the piston 24 into a first oil chamber 29 located on the piston rod 22 side and a second oil chamber 30 located on the free piston 23 side. The two oil chambers 29, 30 communicate through the throttle (not shown) that extends through the piston 24. The high pressure gas chamber 27 can be filled with N2 gas at a high pressure and the first and second oil chambers 28, 29 can be filled with working oil.

The piston rod 22 is provided, at its end on the opposite side from the cylinder 21, with a boss 12b, and a mounting plate 32 can be secured to the boss 12b with the bolt 31. The mounting plate 32 can be secured to the second mounting bracket 14 with a bolt 33. The mounting plate 32 may be welded to the second mounting bracket 14 in some configurations.

The piston 24 with the throttle can be mounted to the piston rod 22 and can be provided with a throttle (not shown) that defines a passage between the first oil chamber 29 and the second oil chamber 30. That is, the hydraulic damper 12 is configured such that the damping force (viscous damping force) is produced when working oil flows through the throttle from the first oil chamber 29 into the second oil chamber or from the second oil chamber 30 into the first oil chamber 29.

The compression coil spring 25 is provided between the piston 24 and a piston rod-side cover 21a of the cylinder 21. The spring force of the compression coil spring 25 can be set to counterbalance the gas pressure in the high pressure gas chamber 27. That is, the free piston 23 is urged against the working oil in the second oil chamber 30 through gas pressure in the high pressure gas chamber 27. However, the throttled piston 24 is maintained in a generally neutral position when biased by the spring force of the compression spring 25.

In addition, in some configurations, the compression coil spring 25 can be formed of a shape-memory alloy or a bimetal. In other configuration, a majority of the spring 25 is formed of such materials. In forming the compression coil spring 25 from such a material, it preferably is arranged such that when the temperature of the compression coil spring 25 is raised (or lowered), its free length in the axial direction of the cylinder 21 is extended (or shortened) to thereby increase (or decrease) the foregoing biasing force.

As a result of adopting such an arrangement, in the illustrated hydraulic damper 12, even if the temperature of the hydraulic damper 12 is raised by the engine heat and the gas pressure in the high pressure gas chamber 27 is increased, the piston 24 can be retained in a generally neutral position. This is because in the illustrated hydraulic damper 12, the spring force of the compression coil spring 25 for biasing the piston 24 also is increased by the temperature rise. Therefore, no load is applied to the two portions to be reinforced of the body from the reinforcement device 2 as a result of the temperature change. The free piston 23 moves in the axial direction by the distance corresponding to the amount of volumetric change caused by movement of the piston rod 22 into or out of the cylinder 21.

The hydraulic damper 12 preferably is attached to the first mounting bracket 13 and the second mounting bracket 14 such that its axis is generally parallel to the axis of the rod 11. In forming the reinforcement device assembly 1 by combining two reinforcement devices 2 in the shape of a letter V in a plan view as in the illustrated embodiment, the hydraulic damper 12 is positioned adjacent to and at the outer side of the rod 11 in the lateral direction of the vehicle body in relation to the connection of both the rods 11, 11 and the cross member 17.

The body reinforcement device 2 preferably is mounted to a vehicle body with the first mounting bracket 13 fixed to the laterally central portion of the suspension member 14 and with the second mounting bracket 14 fixed to the rear pivot portion 8 of the lower arm 7. As a result of the reinforcement device 2 mounted to the vehicle body in this way, the two portions to be reinforced (suspension member 14 and rear pivot portion 8) of the body are connected to each other rigidly by the rod 11.

Therefore, in the illustrated body reinforcement device 2, when the body (chassis 3) is elastically deformed and a load is applied at each end in the direction of compression or the direction of elongation, the rod 11 substantially functions as a beam to thereby reinforce the body. As a result, provision of the reinforcement device 2 enables the deformation of the body to be kept small.

When the body reinforcement device 2 suppresses the elastic deformation of the body, the rod 11 is elastically deformed in the direction of compression or the direction of elongation, with a load applied at each end, and stretches or contracts by its own elasticity. Therefore, the rod 11 attempts to vibrate in the longitudinal direction at this time.

However, because, in the illustrated reinforcement device 2, the hydraulic damper 12 is connected to the rod 11 through the first mounting bracket 13 and second mounting bracket 14 and damping force is produced by the hydraulic damper 12 if the rod 11 vibrates in the longitudinal direction, the vibration of the rod 11 is dampened by the hydraulic damper 12. That is, in the chassis 3 reinforced by the body reinforcement device 2, little to no vibration is produced by the rod 11. Therefore, the illustrated body reinforcement device 2 is able to reduce deformation of the body while also reducing vibration of the rod 11.

In addition, in the body reinforcement device 2 according the illustrated embodiment, the corresponding ends of the rod 11 and hydraulic damper 12 are connected to each other rigidly through the first mounting bracket 13 and the second mounting bracket 14. Therefore, in the illustrated body reinforcement device 2, vibration of the rod 11 can be transmitted directly to the hydraulic damper 12 through the first mounting bracket 13 and second mounting bracket 14. As a result, in the illustrated body reinforcement device 2, the vibration of the rod 11 can be better damped by the hydraulic damper 12.

Further, since the corresponding ends of the rod 11 and hydraulic damper 12 are attached to one mounting bracket 13, 14, the ends of the rod 11 and hydraulic damper 12 can be mounted to the portion to be reinforced at the same time. As a result, the reinforcement device 2 can be easily mounted in position. Because one first mounting bracket 13 is used in common for the body reinforcement device 2 on the left side of the body and the body reinforcement device 2 on the right side of the body, the illustrated reinforcement device assembly 1 having two reinforcement devices 2 can be mounted to the body easily. Further, as a result of adopting the foregoing arrangement, higher strength can be achieved compared with when the body reinforcement device 2 on the left side of the body and the body reinforcement device 2 on the right side of the body are mounted separately at the same positions.

Figure 3A:
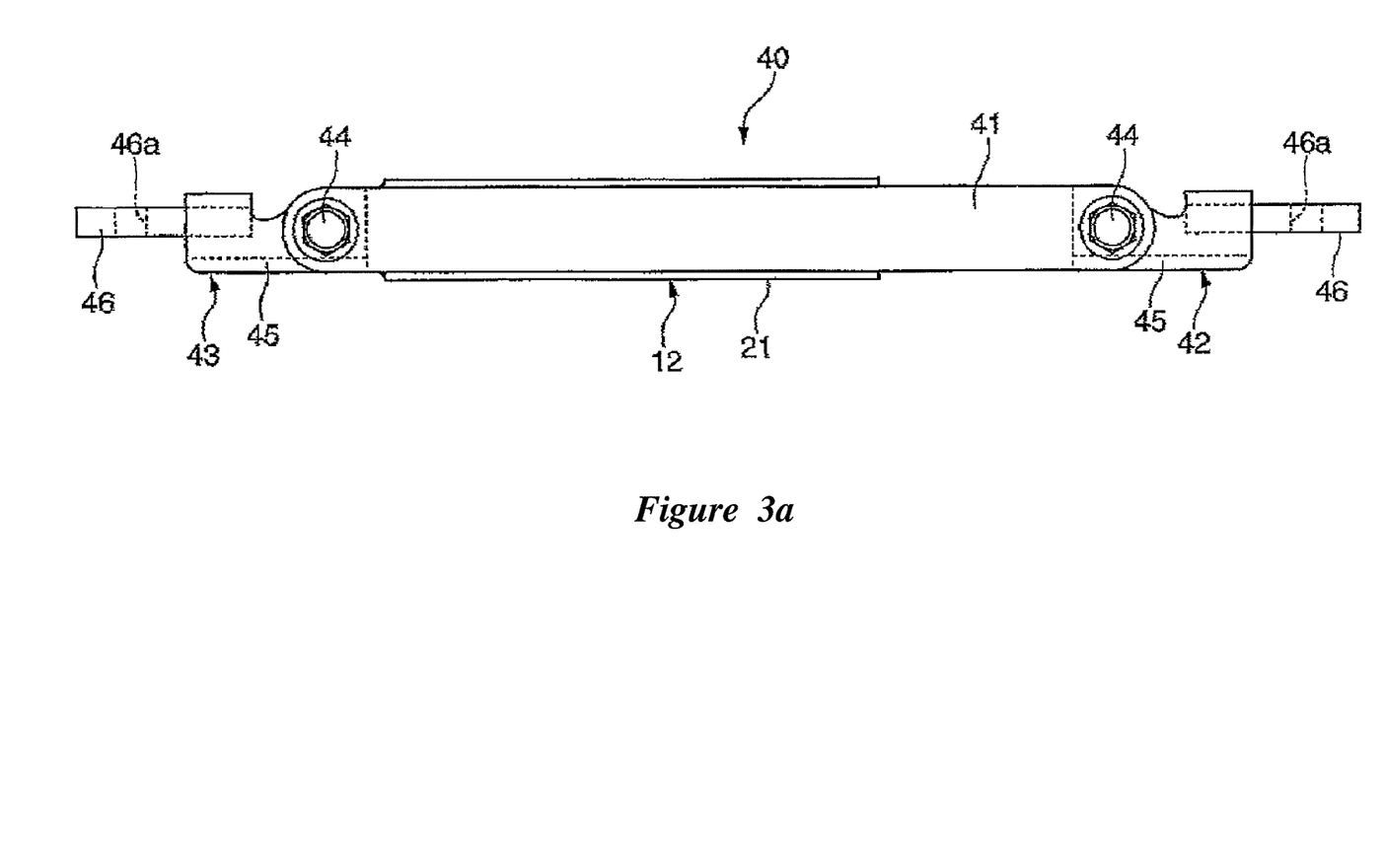
FIG. 3A is a side view showing another embodiment.
Figure 3B:
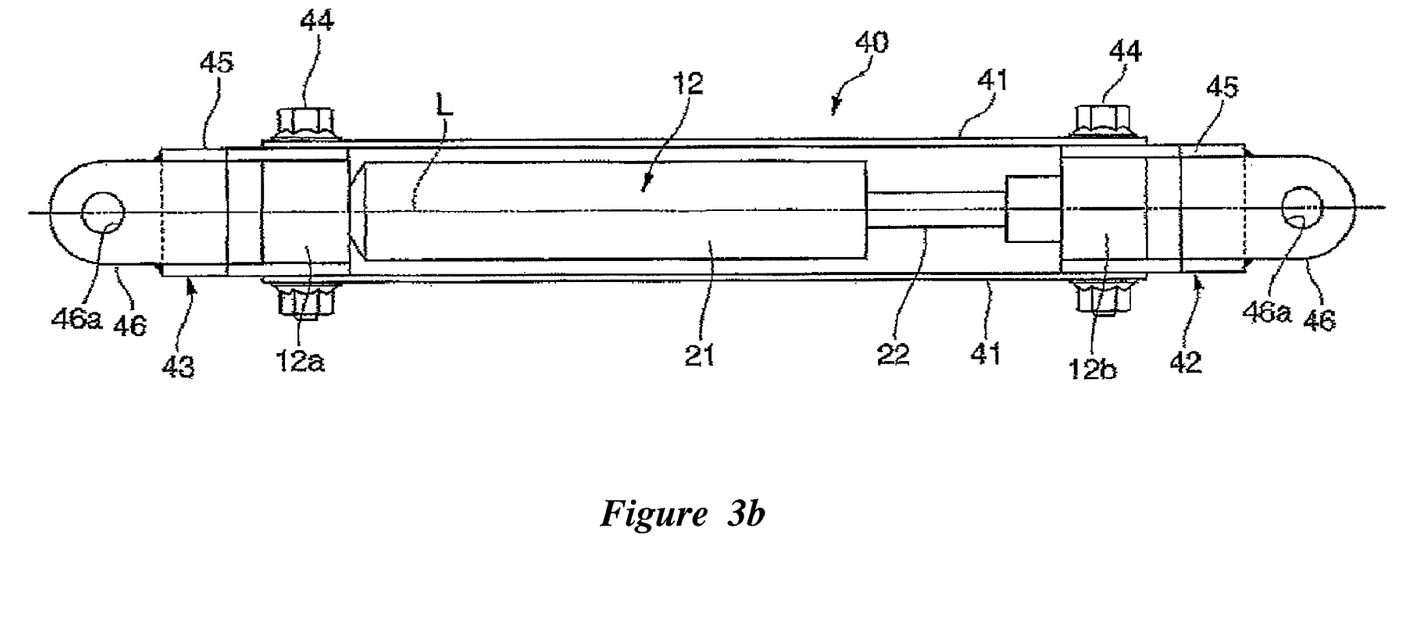
FIG. 3B is a plan view showing the embodiment of FIG. 3A.
Figure 4:
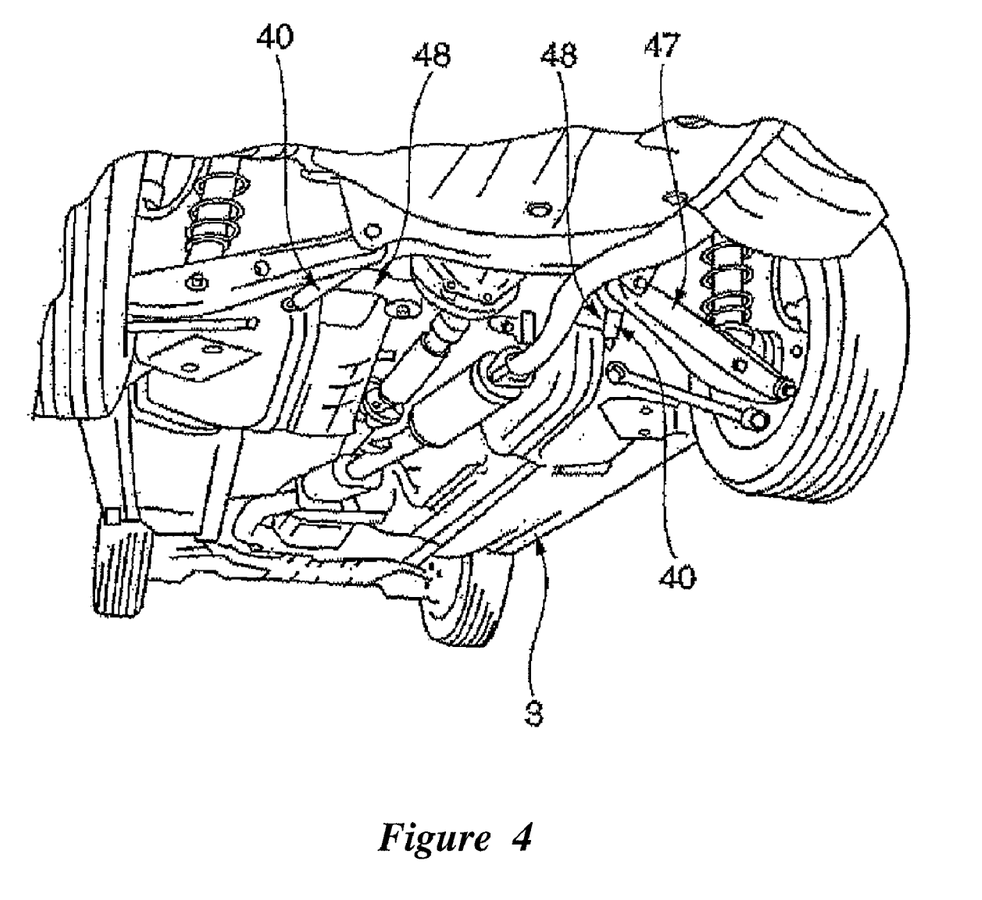
FIG. 4 is a perspective view showing the reinforcement device mounted to a body.

Another embodiment of the body reinforcement device can be formed as shown in FIG. 3A, FIG. 3B and FIG. 4. FIG. 3A is a side view of this embodiment, and FIG. 3B is a plan view showing this embodiment. FIG. 4 is a perspective view showing the reinforcement device mounted to a body. In these figures, the same or similar parts as those described in FIG. 1 and FIG. 2 are designated by like reference numerals and detailed description is not repeated.

A body reinforcement device 40 shown in FIG. 3A, FIG. 3B and FIG. 4 comprises a hydraulic damper 12, one band 41 located on each side of the hydraulic damper 12 and first and second mounting brackets 42, 43 for connecting ends of these hydraulic damper 12 and bands 41, 41 to each other. The hydraulic damper 12 preferably has the same structure as that used in the first embodiment. In this embodiment, the bands 41 constitute the reinforcement member.

Each of the bands 41 can be made from a steel plate formed in the shape of a narrow band and each of the bands can be fixed at both ends to the first and second mounting brackets 42, 43 with fixing bolts 44. The bands 41 may be welded to the first and second mounting brackets 42, 43 in some configurations. Other suitable techniques also can be used.

Each of the first and second mounting brackets 42, 43 comprises a bracket body 45 that can be formed in the shape of a letter C in section. Each of the first and second mounting brackets 42, 43 also can comprise a mounting piece 46 having one end inserted in the inner side of the bracket body 45 and welded thereto. In one configuration, the mounting piece 46 comprises a hole 46a positioned at the laterally central portion (in the direction in which the bands 41 are disposed side by side). The hole 46a can be formed in any suitable manner, including but not limited to drilling.

The illustrated bracket body 45, inside of which a boss 12a, 12b is positioned and at both outer sides of which the bands 41 are overlapped, can be secured to the bands 41 and the hydraulic damper 12 with a bolt 44 that extends through these parts. Because the first and second mounting brackets 42, 43 of the illustrated configuration are attached to the bands 41 and hydraulic damper 12 in this manner, the body reinforcement device 40 is formed with the bands 41 disposed substantially parallel to each other on both sides of the hydraulic damper 12.

The body reinforcement device 40 of FIG. 4 spans the space between two portions to be reinforced because the mounting pieces 46, 46 at both ends are mounted on a mounting portion 48 of a rear wheel suspension device 47. The rear wheel suspension device 47 is configured to be mounted to the chassis 3 on the bottom surface 3 located near the mounting portion 48.

In the body reinforcement device 40 according to this embodiment, the hydraulic damper 12 can be located on the same axis as an imaginary line L (see FIG. 3(b)) connecting the two portions to be reinforced (mounting portion 48 and bottom surface of the chassis 3). Further, in this body reinforcement device 40, the two bands 41, 41 can be located at symmetrical positions with respect to the imaginary line L. Other suitable configurations also can be used.

Therefore, because a load applied from the portion to be reinforced can be distributed generally uniformly to the two bands 41, 41 of the illustrated configuration and because the load acts on the hydraulic damper 12 in its axial direction, no or virtually no moment due to a reaction force is produced when the load is applied, and the reaction force is allowed to act in the longitudinal direction (in the direction along the imaginary line L) for firm reinforcement of the body.

Figure 5A:
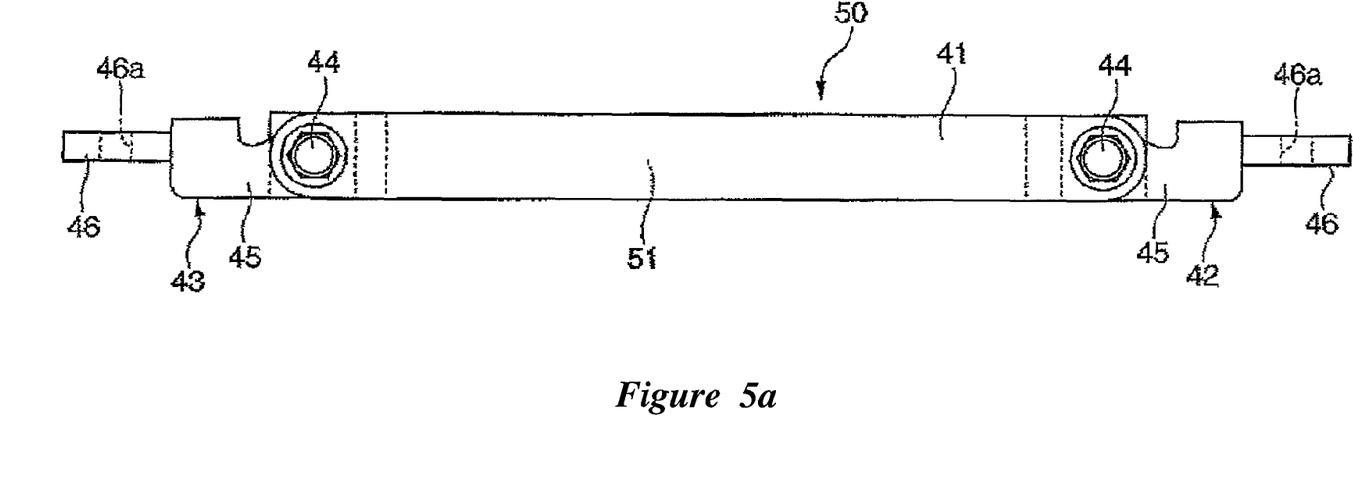
FIG. 5A is a side view showing another embodiment.
Figure 5B:
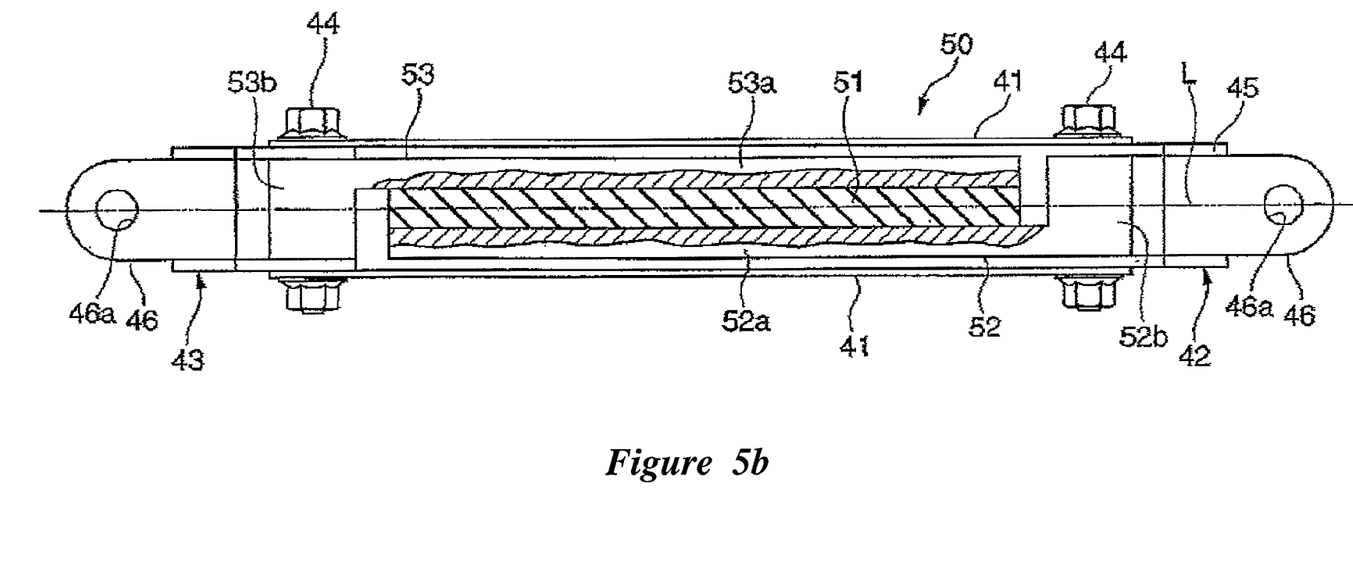
FIG. 5B is a plan view showing the embodiment of FIG. 5A.

Another embodiment of the body reinforcement device for a vehicle can be formed as shown in FIG. 5A and FIG. 5B. FIG. 5A is a side view and FIG. 5B is a plan view with a portion broken away. This device can be mounted in the same manner as the embodiment of FIGS. 3A and 3B, which is show in FIG. 4. In FIG. 5A and FIG. 5B, the same or similar parts as described in FIG. 1 to FIG. 4 are designated by like reference numerals and detailed description is not repeated.

The body reinforcement device 50 shown in FIG. 5A and FIG. 5B is provided, as damping force generating means for generating viscous damping force, with a viscoelastic member 51 made of rubber. The viscoelastic member 51 can be formed in the shape of a band extending substantially parallel to a band plate 41 and can be coupled to the band plate 41 while being held between a pair of supporting bars 52, 53.

The supporting bars 52, 53 can be formed by a metallic material or any other suitable material. The supporting bars 52, 53 can comprise plate-like portions 52a, 53a that extend in the longitudinal direction of the band plate 41 along the main surface of the viscoelastic member 51, and the supporting bars 52, 53 can also comprise bosses 52b, 53b fixed with the bond plates 41 to bracket bodies 45 with bolts 44. Other suitable techniques also can be used. One main surface of the viscoelastic member 51 preferably is fixed to the plate-like portion 52a of one supporting bar 52 and the other main surface of the viscoelastic member 51 preferably is fixed to the plate-like portion 53a of the other supporting bar 53.

The boss 52b of one supporting bar 52 of these supporting bars 52, 53 can be attached to a first mounting bracket 42 at one end of the body reinforcement device 50 and the boss 53b of the other supporting bar 53 can be attached to a second mounting bracket 43 at the other end of the body reinforcement device 50.

The plate-like portions 52a, 53a, as shown in FIG. 5B, preferably are located at positions offset to opposing sides of the imaginary line L and also preferably are located at positions that are symmetrical with respect to the imaginary line L when supporting the viscoelastic member 51 with the imaginary line L passing through substantially the center of the viscoelastic member 51.

In the body reinforcement device 50 arranged as described above, the band 41 substantially functions as a beam to reinforce the vehicle body, and when the band 41 vibrates in the longitudinal direction, the viscoelastic member 51 is elastically deformed in the direction of its surface to thereby produce damping force. As a result, the chassis 3 reinforced by the body reinforcement device 50 is less likely to vibrate substantially. Therefore, the body reinforcement device 50 is able to keep the deformation of the vehicle body small while keeping the vibration of the band 41 small.

Although in the foregoing first through third embodiments, examples are shown in which both ends of the rod 11 or the band 41 and both ends of the hydraulic damper 12, or the ends of the supporting bars 52, 53, are attached to the first or the second mounting brackets 13, 14, 42, 43, these mounting brackets may be attached only to one end of the reinforcement devices 2, 40, 50. In adopting such an arrangement, at the other ends of the reinforcement devices 2, 40, both of the rod 11 or the band 41 and the hydraulic damper 12 can be mounted directly to the portion to be reinforced of the body. In adopting such an arrangement, at the other end of the body reinforcement device 50, the band 41 and the member of the supporting bars 52, 53 on the opposite end can be mounted directly to the mounting portion of the vehicle body. Although mounting man-hours are increased, an arrangement may be adopted in which both ends of the rod 11 or the band 41, both ends of the hydraulic damper 12 and the ends of the supporting bars 52, 53 are mounted directly to the portion to be reinforced of the vehicle body separately, in which case as in the foregoing embodiment, the body can be reinforced while preventing generation of the vibration.

In addition, although in the second and the third embodiment examples are shown in which bands 41 are disposed at the sides of the damping force generating means (hydraulic damper 12, viscoelastic member 51), the damping force generating means may be disposed on both sides of one reinforcement member (rod 11 or band 41). Further, although in the second and the third embodiment examples are shown in which the plate-like band 41 is used, a bar-like reinforcement member may be used as shown in the first embodiment. Furthermore, the reinforcement device may be arranged such that the reinforcement devices 40, 50 shown in the second or the third embodiment are connected in series. In arranging these members in series, bars 11 can be welded to the reinforcement device 40, 50 at both ends such that they are located on the same axial line, respectively. Such a configuration, however, is less desirable than the parallel configurations described herein.

Further, although the foregoing embodiments, examples of which reinforce the front wheel suspension device 4 or the rear wheel suspension device 47, the reinforcement device may be used for reinforcing other portions of the vehicle body. For example, the reinforcement device may be provided in an automobile with an engine mounted at the front of the vehicle body such that it crosses an opening of the engine room in the upper part in the lateral direction. In adopting this arrangement, a reinforcement device may be used which is formed by the rods 11 being arranged in series at both ends of the reinforcement device 40, 50 shown in the second or the third embodiment and welded thereto, for example.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A body reinforcement device for a vehicle comprising:
   a rigid reinforcement member connecting two portions of a vehicle body to each other; and
   a damping force member connecting the two portions of the vehicle body such that both the rigid reinforcement member and the damping force member generally span the space between the two portions of the vehicle body; wherein
   the rigid reinforcement member and the damping force member are disposed side by side in a parallel orientation to each other;
   the rigid reinforcement member includes a first end and a second end;
   the damping force member includes a first end and a second end; and
   the rigid reinforcement member first end and the damping force member first end collectively are fixed to one of the two portions of the vehicle body by one mounting bracket.

2. The body reinforcement device for a vehicle as claimed in claim 1, wherein the damping force member comprises a hydraulic damper.

3. The body reinforcement device for a vehicle as claimed in claim 1, wherein the damping force member comprises a rubber viscoelastic member.

4. The body reinforcement device for a vehicle as claimed in claim 1, wherein the rigid reinforcement member comprises a first member and a second member, the first and second members being disposed side by side to the damping force member.

* * * * *